United States Patent [19]
Buckley et al.

[11] Patent Number: 5,966,381
[45] Date of Patent: Oct. 12, 1999

[54] METHOD AND APPARATUS FOR EXPLICIT RATE FLOW CONTROL IN ATM NETWORKS

[75] Inventors: Clifford James Buckley, San Jose, Calif.; Israel Cidon, Haifa, Israel; Asad Khamisy, Fremont; Raphael Jona Rom, Palo Alto, both of Calif.

[73] Assignee: Sun Microsystems, Inc., Mountain View, Calif.

[21] Appl. No.: 08/619,040

[22] Filed: Mar. 20, 1996

[51] Int. Cl.$^6$ .............................. H04L 12/28; H04L 12/56
[52] U.S. Cl. .............................................. 370/395; 370/468
[58] Field of Search ..................................... 370/395, 397, 370/399, 463, 420, 412, 232, 465, 468, 409

[56] References Cited

U.S. PATENT DOCUMENTS

| | | | |
|---|---|---|---|
| 5,515,363 | 5/1996 | Ben-Nun et al. ........................ | 370/397 |
| 5,619,502 | 4/1997 | Kahn et al. .............................. | 330/397 |
| 5,633,859 | 5/1997 | Jain et al. ............................... | 370/234 |
| 5,675,576 | 10/1997 | Kalampoukas et al. ................ | 370/232 |

OTHER PUBLICATIONS

Computer Networks and ISDN Systems, "Congestion Control and Traffic Management in ATM Networks: Recent Advances and A Survey", Raj Jain, Jan. 26, 1995, (29 pages).

ATM Forum/94–0692, "Congestion Control With Explicit Rate Indication", Anna Charny, David D. Clark, Raj Jain, Jul. 1994, (5 pages).

ATM Forum/95–1095, "Example Switch Algorithm for Section 5.4 of TM Spec", Andrew W. Barnhart, Feb. 6–10, 1995, Burlingame, Ca, (7 pages).

ATM Forum/95–0178RI, "A Sample Switch Algorithm," Raj Jain, Shiv Kalyanaraman, Ram Viswanathan, and Rohit Goyal, Feb. 6–10, 1996, (7 pages).

ATM Forum/94–0888, "Adaptive Proportional rate Control (APRC with Intelligent Congestion Indication," Kai–Yeung Siu, and Hong–Yi Tzeng, Sep. 27, 1994, pp. 1–9.

ATM Forum/95–0695, "NIST ER Switch Mechanism (An Example)," N, Golmie, Y. Chang, and D. Su, Jun. 5–9, 1995, Orlando, Fl, pp. 1–6.

IEEE Network, "The Rate–Based Flow Control Framework for the Available Bit Rate ATM Service," Mar./Apr. 1995, pp. 25–39.

ATM Forum Technical Committe, "ATM Forum Traffic Management Specification," Version 4.0, Mar. 1996, pp. ii–vii, 68–86.

Jeffrey M. Jaffe, "Bottleneck Flow Control," IEEE Transactions on Communications, vol. Com–29, No. 7, Jul. 1981, pp. 954–962.

*Primary Examiner*—Ajit Patel
*Attorney, Agent, or Firm*—Blakely Sokoloff Taylor & Zafman

[57] ABSTRACT

An efficient, cost effective method and apparatus for performing resource allocation of available bit rate (ABR) virtual circuit (VC) in an asynchronous transfer mode (ATM) network includes an explicit rate switch process performed at at least one switch of an ABR VC. The process provides a fast and more accurate computation of the number of active VCs in an ATM network. Furthermore, the fair share allocation is calculated at the switch in a way that is efficient and lends itself easily to implementation in hardware. For example, in one embodiment, the fair share is implemented using a series of counters and registers controlled by a state machine. This simple hardware implementation enables fast convergence to a current final state so that timely accurate resource utilization and allocation to the ABR VCs can be determined.

25 Claims, 5 Drawing Sheets

METHOD AND APPARATUS FOR EXPLICIT RATE FLOW CONTROL IN ATM NETWORKS

BACKGROUND OF THE INVENTION

1. Field of the Invention

The present invention relates to a method and apparatus for allocating bandwidth at a switch in an asynchronous transfer mode network.

2. Art Background

Asynchronous transfer mode (ATM) networks have achieved widespread popularity. Briefly, an ATM network consists of switches interconnected by links to form configurable networks between source and destination devices. The switches route cells of data which are 53 bytes in length. The cells are routed across a virtual circuit (VC) established between the source device and a destination device. Each virtual circuit is composed of one or more links and switches. A link or a switch is not exclusive to a single virtual circuit; multiple virtual circuits can be routed across a single link. The resources available, for example, the bandwidth of the switch or link, are limited by the physical constraints of the network. Thus, the network must provide a way to allocate network resources so that the capacity of the elements, e.g., the links, is not exceeded.

In circuit switched computer networks (both actual and virtual circuit switching) it is advantageous for applications to make resource reservations ahead of time. This will guarantee the application operating on the source/destination device the resources it requires. Such a reservation requires that the applications be able to estimate ahead of time their resource requirements. While this knowledge is typically available to audio or video communication applications, this information typically is not known to other data applications (this includes existing applications which were not designed to predict or state in advance their resource requirements as well as applications that inherently cannot predict their usage patterns). Therefore, a different mechanism is required in order to provide service to such applications.

Thus, network usage is divided into two classes—applications that do and applications that do not state resource requirements in advance. Those applications that will state their requirements in advance are guaranteed those resources (subject to their availability at the time the reservation is made). The remaining applications will have to share the remaining available bandwidth. These VCs are referred to as available bit rate (ABR) VCs. The problem with ABR VCs is to determine what network resources are available and how to share the available resources among the applications that request the resources in a way that is both fair to the users and efficient for the network. Thus, fairness, high link utilization and fast response to congestion conditions are desired features of such mechanisms.

Congestion can occur when the total input rate or bandwidth of VCs that traverse a given link is greater than the available link capacity. As a result, buffers to the links of the switches may overflow and cells may be dropped. For ABR VCs, congestion conditions typically occur due to a time difference between the moment cells are released by a device into the network and the moment feedback is received regarding the state of the network resulting from this and other cell traffic.

One simple approach to perform flow control is by using an Explicit Flow Control Indicator (EFCI). An application at the source device adapts the rate at which cells are transmitted according to a single congestion bit generated by the network or destination device. The source device increases the rate when no congestion indication is received, and decreases the rate upon the reception of an indication of congestion. Such a mechanism does not result in a fair allocation of the resources among the requesting users (due to the "beat down effect" in which cells from VCs that pass through many switches are more likely to be marked with a congestion indication than cells from VCs that pass through fewer switches), and may also cause severe fluctuations between congested and not congested states.

A better method to control congestion is to inform the source device to adjust the rate in order to match the available link capacity. The available link capacity can change as a result of establishment and termination of VCs as well as changes in network usage that are inherent in the statistical nature of network behavior. This type of method attempts to control congestion to achieve high utilization of the available link capacity while sharing the available bandwidth capacity in a fair manner.

The general approach is for devices that do not explicitly state their bandwidth requirement to issue an Available Bit Rate (ABR) request to the network alerting the network to their existence. The network will then, from time to time, inform each device of its current share of the available bandwidth. The user must then obey (i.e., not exceed) its currently assigned rate.

One structure for administering flow control is described in A. F. Bonomie, K. W. Fendick, "Rate-Based Flow Control for ATM Networks", IEEE Network (March/April 1995) pp. 25–39. In the mechanism described, a network source device is required to send from time to time special resource management (RM) cells for every virtual circuit for which this device is the source. RM cells transmitted by the source device are referred to as forward RM cells (FRM). These RM cells traverse the links and switches of the virtual circuit from source device to destination device, possibly gathering information on the way. Once the FRM cell reaches the destination, the cell is sent back to the source device, again with possible computations regarding resource allocation performed on the way. The FRM cells turned around at the destination device of the virtual circuit and sent back to the source device are referred to as backward RM cells (BRM). When the BRM cell finally reaches the source device, the cell contains the desired feedback information regarding the bandwidth available for that virtual circuit. The source device can then update the current transmission rate for that virtual circuit based upon the feedback information.

Advanced flow control approaches fall into the category of an explicit rate flow control mechanism in which each device is fed back an explicit quantitative indication of the amount of bandwidth that is available for every virtual circuit originating in that device. Explicit rate algorithms must perform three important functions:

1. Determine the load in the various links and routes of the network.
2. Compute the fair share of the bandwidth for a virtual circuit.
3. Determine the actual (explicit) rate or bandwidth for each virtual circuit and feed the rate back to the source of the virtual circuit.

To be useful, these rate algorithms must be fast in order to provide accurate and timely information. In order to meet the above requirements, the algorithms should be distributed and implemented in hardware, not executed centrally for all switches and not involve the programmable switch controller in the process.

A crucial factor in the design of a flow control mechanism is the definition and determination of fair share. The fair share value is used to determine how much bandwidth a particular virtual circuit is allocated. The most commonly used criterion for fairness is referred to as the Max-Min allocation. This method allocates the resources such that applications that require little of the network (below some minimum bandwidth value) receive whatever is requested, whereas applications requiring more resources equally share in the rest of the resources. A unique property of this allocation is that no rate increase of a given virtual circuit is possible without a corresponding decrease of the rate of another virtual circuit with equal or smaller allocation of bandwidth.

The rate of convergence also is important in flow control. A time gap exists between when the time data (e.g., an FRM cell) is inserted into the network and the time feedback (via, for example, a BRM cell) regarding the effect of this data is fed back to the source device. More particularly, there is a time lag from the time a source sends cells out on the network and the time the source receives resource allocation information back regarding modification of the bandwidth in accordance with the resources available. This delay causes temporary inaccuracies in the allocation and renders the network vulnerable to congestion problems. Consequently, it is crucial that the explicit rate algorithm converges fast to a final state. For example, when the available bandwidth is reduced, rapid convergence minimizes the potential of congestion and when the available bandwidth is increased rapid convergence likewise increases network utilization.

SUMMARY OF THE INVENTION

An explicit rate switch process performed at at least one switch of an available bit rate virtual circuit (VC) and structure for performing the same is described. The process provides a fast and more accurate computation of the number of active VCs in an asynchronous transfer mode (ATM) network. The switch associates a state with each VC. The states are updated periodically by the switch depending upon the arrival of cells during timeframes of determined length. The active state indicates a cell has arrived at the switch within the time period since the last update of the states. The test state indicates that no cell arrived since the last update when the VC was observed as active. The inactive state indicates that no cell has arrived since the last update when the VC state was observed as test. Thus, when a cell arrives at the switch, the switch updates the VC state of the virtual circuit the cell arrived on to active, and if the state was inactive increments the count of the number of active VCs by one. At the end of each predetermined time period, the switch updates the VC states by setting those VC states identified as active to test and those VC states identified as test to inactive. In addition, the VC count is decremented by one for each VC state set from test to inactive. As the count of the number of active VCs is dynamic and reflective of actual network resource usage, a more timely and accurate computation of resource allocation can be performed.

Furthermore, the fair share is calculated in a way that is efficient and lends itself easily to implementation in hardware. For example, in one embodiment, the fair share is implemented using a series of counters and registers controlled by a state machine. This simple hardware implementation enables fast convergence to a current final state so that timely accurate resource utilization and allocation to the ABR VCs can be determined.

BRIEF DESCRIPTION OF THE DRAWINGS

The objects, features and advantages of the present invention will be apparent to one skilled in the art from the following detailed description in which.

DETAILED DESCRIPTION

Figure 1:
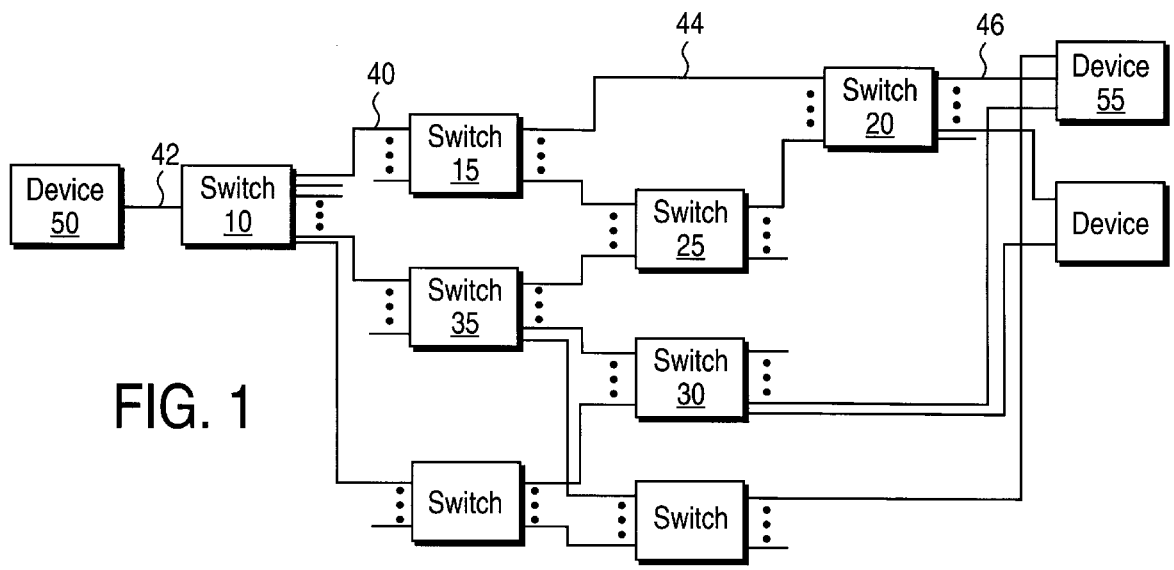
FIG. 1 is a simplified block diagram of an asynchronous transfer mode (ATM) network which implements the method and apparatus of the present invention.

A simplified block diagram of an exemplary asynchronous transfer mode (ATM) network is shown in FIG. 1. The network is composed of a plurality of switches, e.g., 10, 15, 20, 25, 30, 35 interconnected by a plurality of links. For example, link 40 is located between switch 10 and switch 15. Each switch 10, 15, 20, 25, 30, 35 maintains information regarding each virtual circuit routed through the switch in order to switch a cell between an input and an output link of the switch. By selecting the proper links, a particular path can be obtained between a source device 50 and destination device 55. The links and switches through which data is routed and the associated resources used are referred to as a virtual circuit (VC). For example, the VC as shown in FIG. 1 between device 50 and 55 would be composed of links 40, 42, 44 and 46 and switches 10, 15 and 20. Exemplary switches include those manufactured by Fore Systems in Warrendale, Pa., Newbridge in Herndon, Va. and American Telephone and Telegraph (AT&T) in Murray Hill, N.J. It is readily apparent that this network is exemplary and the process and structures described herein are not limited to this particular network embodiment.

Each link typically can support a plurality of VCs. However, the links have a physical bandwidth which can limit the bandwidth at which a virtual circuit operates. For those devices that do not schedule resources in advance, the virtual circuit is constrained by the bandwidth available at the time it requests use of resources, e.g., switches and links.

In accordance with ATM network protocols (see, for example, ATM Forum, Traffic Management Specification, version 4.0 (atmf 95-0013 R10), February, 1996) the source device of a virtual circuit sends a forward resource management (FRM) cell periodically through the links and switches composing the virtual circuit. This FRM cell typically is sent once every predetermined number of data cells that are transmitted by the source, or when the source is idle, at least once every predetermined time period. The FRM cell traverses through the links and is processed by switches of the virtual circuit until it reaches the destination device 50, which sends the message back as a backward RM (BRM) cell. In the system of the present invention, at the switches a value of fair share of the available bandwidth is determined. This fair share value is used to determine the explicit rate (ER) that the virtual circuit can use at that time to transmit cells. The ER is a field in the RM cells (220, FIG. 2). Once the source device 55 receives the BRM cell containing the ER field updated by the switches, the allowed communication rate is updated to the ER rate to conform the allowed transmission rate to the ER rate provided. The source device can then update the current communication rate (CCR) to be a value up to the allowed transmission rate.

Figure 2:
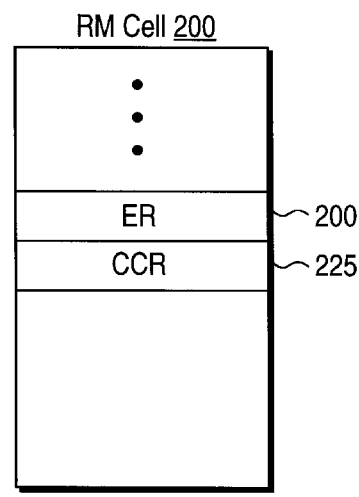
FIG. 2 is a table illustrating an example of some of the contents of a resource management (RM) cell used for available bit rate virtual circuits.

A portion of the contents of an exemplary RM cell is shown in FIG. 2. As is readily apparent to one skilled in the art, the RM cell utilized is not limited to the embodiment disclosed herein and can include more information than that shown. Referring to FIG. 2, the RM cell 200 includes an explicit rate (ER) field 220. Initially, the explicit rate (ER) field indicates the bandwidth which the ABR virtual circuit desires. This value is updated by the switches of the virtual circuit in accordance with the fair share of a valuable bandwidth computed. The CCR field 225 indicates the current transmission rate used.

As will be described below, each switch through which the VC is routed computes the fair share of the available bandwidth for every active ABR VC and uses this value to determine the value of the ER field of the BRM cell. Upon receiving a BRM cell, if the value in the ER field contained within the message is greater than the fair share computed, the value in the ER field is replaced with a value that is a function of the newly computed fair share value and the value of the CCR field.

The computation of the fair share and the variables required to compute the fair share must be performed in a timely and efficient manner such that the rate of convergence to a current final value is rapid. Thus, accurate allocation of resources can be provided based on the current state of the network.

One significant variable which requires timely computation is the number of active virtual circuits (#Active_VC). An accurate estimate of the number of active virtual circuits is needed to best utilize resources. For example, if the number of active virtual circuits is overestimated, the resources will be underutilized. Correspondingly, if the number of active virtual circuits is underestimated, congestion can occur.

The system and method of the present invention uses a technique for estimating the number of active virtual circuits which is more accurate than prior art techniques. More particularly, in the system and method of the present invention, an active VC is one upon which cell activity has been viewed within a predetermined timeframe. Thus, by providing a more accurate estimate of the number of active VCs and using this number in the computation of fair share, better usage of resources are utilized. To determine the number of active VCs, the system and method of the present invention utilizes a mechanism which identifies a VC to be in one of three states. The state information is stored in a VC table located in each switch through which a VC is routed.

Figure 3A:
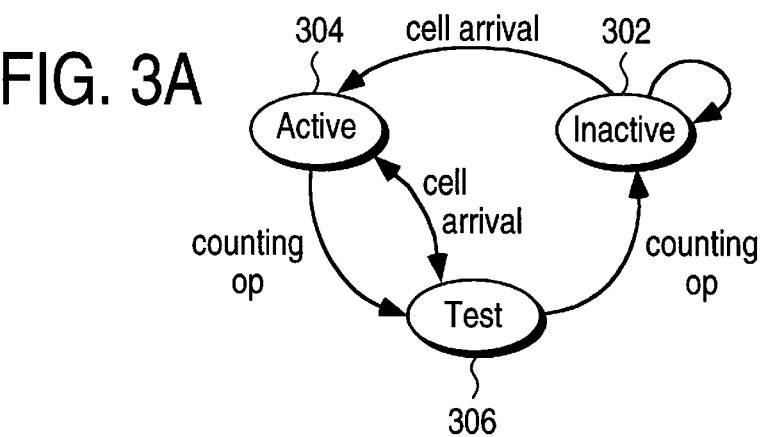
FIG. 3a is a simplified state diagram illustrating the three virtual circuits (VC) states utilized to maintain an active count of virtual circuits in the structure and method of the present invention.

FIG. 3a is a simplified state diagram illustrating the three states. A VC initially is considered to be in an inactive state 302. When a cell arrives at the switch, the switch updates the VC state to be active 304. Similarly, if the VC state is indicated as the test state 306 and a cell arrives, the state will be updated to active 304. Concurrently with the monitoring of cell activity, a timer is used to set a predetermined time interval. At the lapse of each time interval, those VCs identified as active are changed to the test state 306, and those VCs identified in the test state 306 are set to the inactive state 302. When a VC state is changed from the test state 306 to the inactive state 302, the ongoing count of the number of active VCs is decremented by one. Similarly, when a VC state is changed from inactive 302, to active 304 (when a cell arrives), the ongoing count of the number of active VCs is incremented by one. Thus, a simple but effective technique for determining the number of active VCs is used.

FIG. 3a illustrates the flow for one process for determining the number of active VCs. This process further identifies whether a particular VC is in an overload state. A VC is identified to be in an overload state if the current rate of the VC (as indicated by the CCR field) is greater than the fair share computed. This situation arises when the available network resources change (e.g., due to establishment of additional ABR VCs) prior to updating the rate at the source. As will be explained subsequently, the overload state and the count of the number of VCs operating in an overload state is used to determine the fair share and the rate at which the VC is permitted to operate.

Figure 3B:
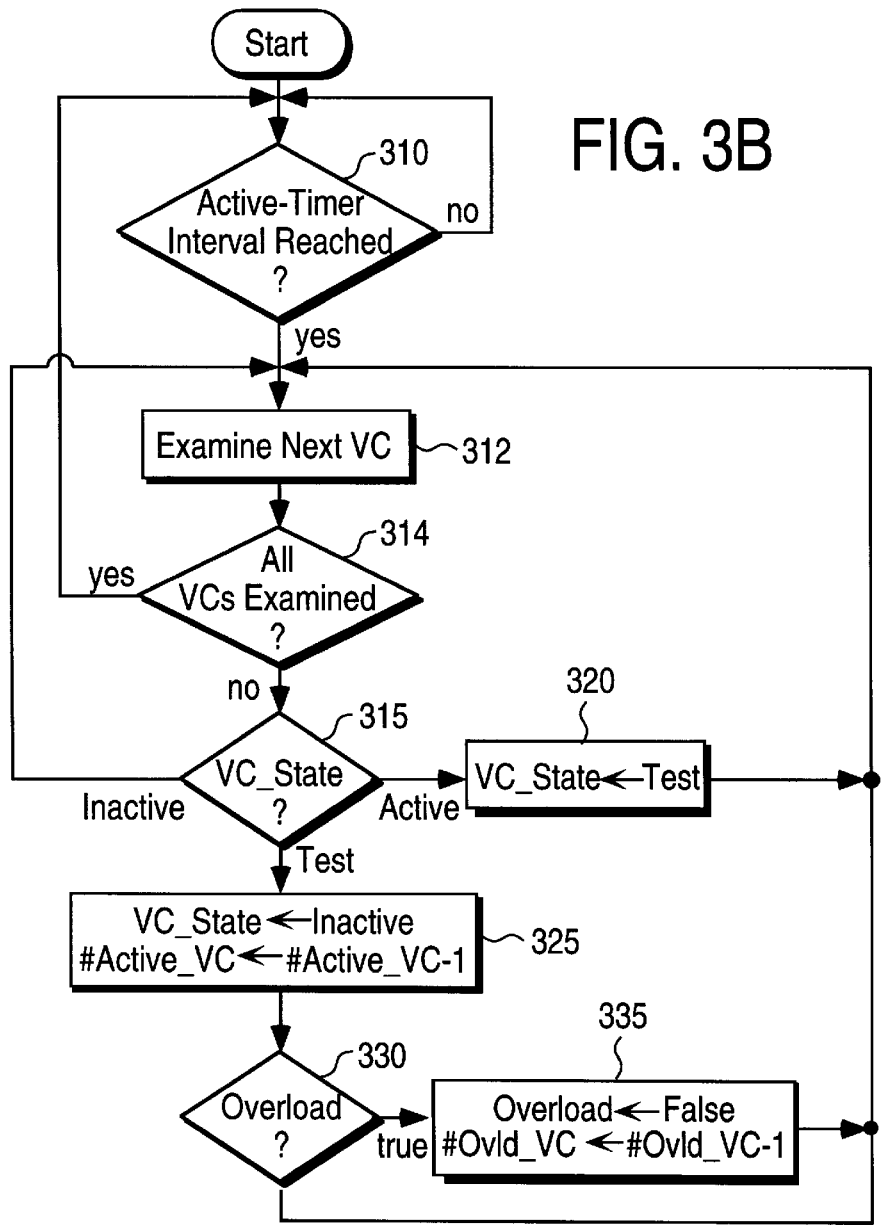
FIG. 3b is an exemplary flow chart illustrating one method for updating the VC states in accordance with the teachings of the present invention.

Referring to FIG. 3b, at step 310, at the end of the active timer interval 310, the state of each VC routed through the switch is examined, steps 312, 314, 315. If the VC state for a particular VC is active, then the VC state is set to test 320. If the state is inactive, the state remains in the inactive state and loops back to step 312. If, at step 315, the VC state is test, then at step 325 the VC state is set to inactive and the number of active VCs (#Active_VC) is decremented by one. At step 330, it is then determined whether the overload state for a VC, also maintained in the VC table at the switch through which a particular VC is routed, has been set to true. If the overload state has been set to true, it is then reset to false, step 335, and a count maintained of the number of virtual circuits operating in overload (#Ovld_VC) is decremented by one.

Figure 4:
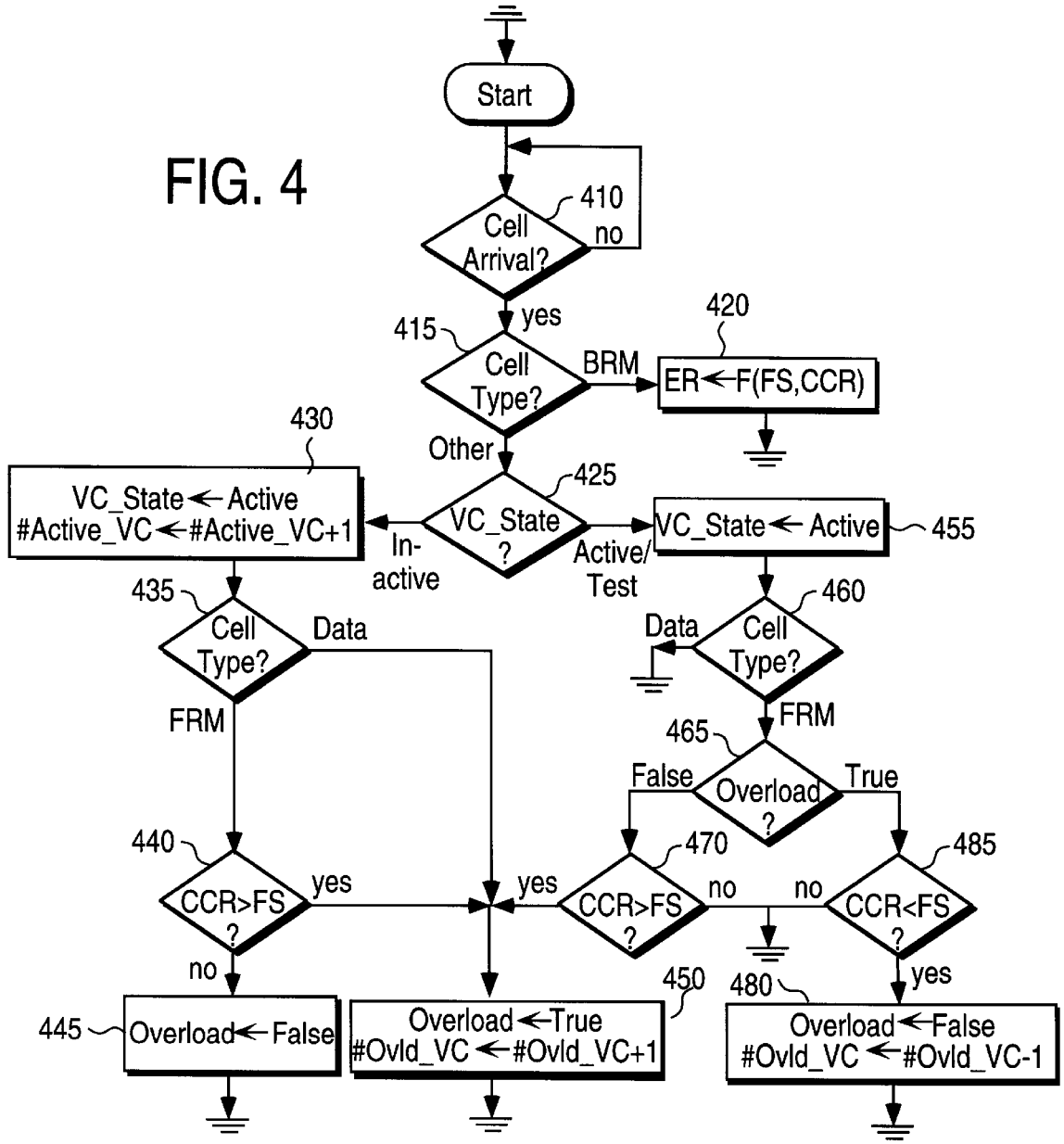
FIG. 4 is a flow chart illustrating one embodiment of the process for updating parameters utilized to compute the fair share and also to assign an explicit rate in accordance with the teachings of the present invention.

FIG. 4 is a flow chart that illustrates a more detailed embodiment of the ongoing update of parameters utilized to compute the fair share. At step 410, when a cell arrives, the cell type is determined, step 415. As explained previously, the cell can be a resource management (RM) cell or a cell containing data. If the cell type is a BRM cell then the explicit rate (ER) is set to a value which is a function of the fair share (FS) and the current communications rate (CCR), step 420. It is contemplated that a variety of functions can be used. For example, the ER is set to:

$$ER = FS - d*(FS - CCR)$$

where d is a configurable positive constant between 0 and 1.

Continuing with the process set forth in FIG. 4, if the cell type is other than a BRM cell, the VC state is examined, step 425. If the VC state is inactive, then at step 430 the VC state is set to active and the number of active VCs is incremented by one. At step 435, the type of cell is then examined. If the cell is an FRM cell, and the CCR is greater than the FS, then the overload state for the VC is set to true and the number of overloaded VCs is incremented by one, step 450. If at step 440, the CCR is not greater than the FS, then the overload state of the VC is set to false, step 445. If at step 435, the type of cell is a data cell, then step 450 is again performed.

Going back to step 425, if the VC state is active or test, the VC state is set to active. If at step 460, the type of cell is an FRM, the overload state is examined, step 465. If the overload state is false and the CCR is greater than the FS, step 470, step 450 is performed. If, however, the overload state is true and the CCR is less than the fair share, step 475, then the overload state is set to false, step 480, and the number of overloaded VCs is decremented by one, step 480.

Figure 5:
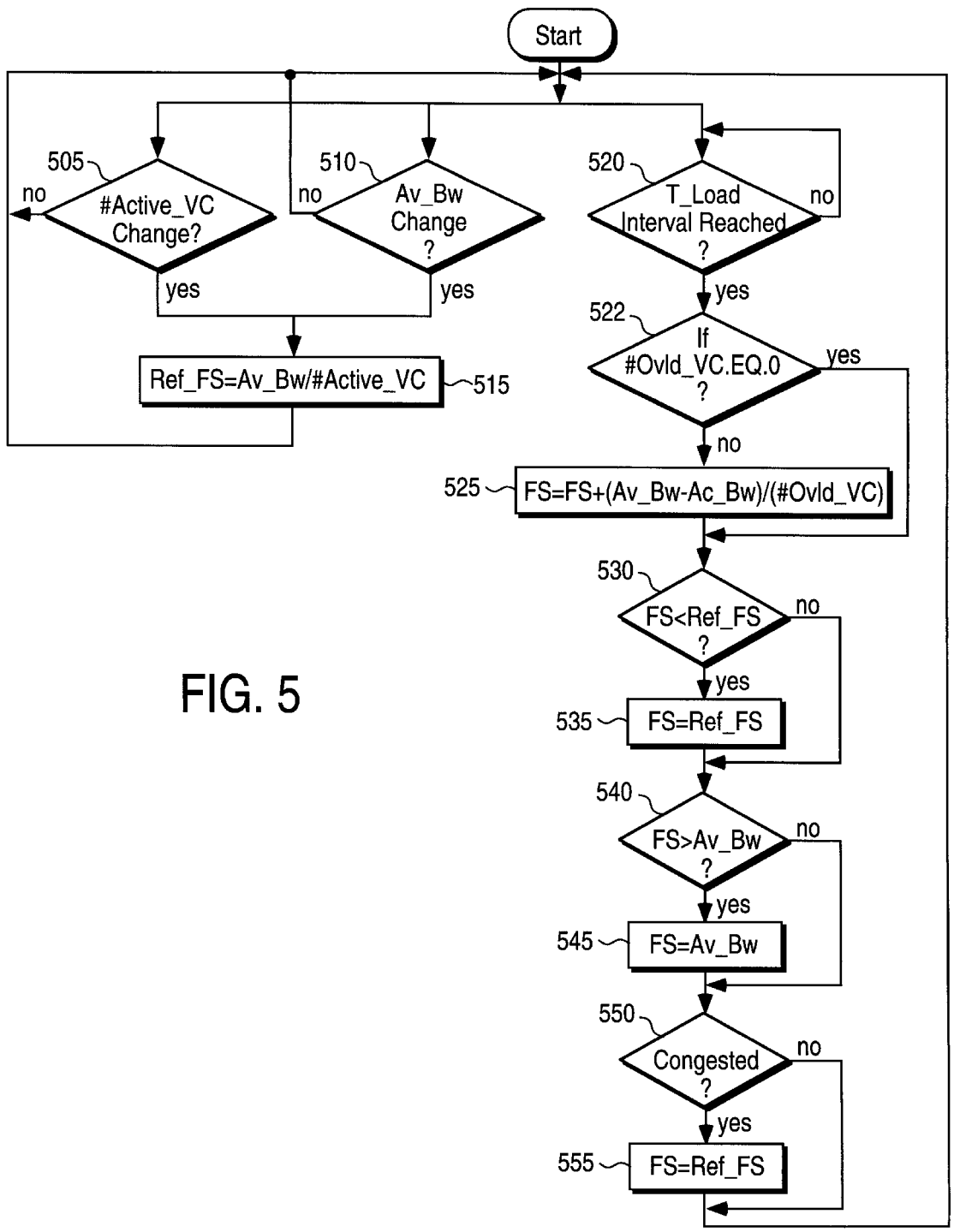
FIG. 5 is a flow diagram illustrating one embodiment of the computation of fair share in accordance with the teachings of the present invention.

Using this information, the fair share can then rapidly be determined on an ongoing basis. An exemplary flow diagram is shown in FIG. 5. At steps 505 and 510, if the number of active VCs change, or if the available bandwidth for ABR traffic changes, then the reference fair share is updated.

The available bandwidth for ABR traffic can be measured in a variety of ways. For example, in a static discipline the available bandwidth is equal to a fraction or percent of the non-reserved bandwidth at the output link. In a dynamic discipline, the bandwidth is equal to the fraction or percent of the maximum of the non-reserved bandwidth at the output length, and the unused bandwidth during a time interval, such as the time interval during which the average load of ABR traffic is measured.

The number of active VCs is preferably measured in accordance with the teachings provided herein, although it is contemplated that other methods for determining the number of active VCs can be used with this process for determining fair share.

Referring back to FIG. 5, if the available bandwidth for ABR traffic or the number of active VCs change, then a reference fair share value (Ref_FS) is updated to a value which corresponds to the available bandwidth for ABR traffic divided by the number of active virtual circuits (steps 505, 510, 515). This provides a way to immediately respond to change in the dynamics of the environment so that a more accurate calculation of fair share and thus, utilization of resources can be obtained.

In addition, it is preferred that the fair share be updated as needed on a periodic basis. Referring to step 520, the fair share will be updated every T_load time interval. T_load is a time interval during which the average load of ABR traffic is measured. The size of the interval affects the accuracy of the measurement and the response to changes in the load. Small intervals are desirable to achieve fast response, i.e., increase or decrease of the fair share in underload or overload conditions, respectively. Large intervals are desired for better estimation of load; especially for bursty traffic where small intervals may cause oscillations in the feedback sent to the source. Thus, the T_load interval can be set according to the performance desired. Preferably, T_load is set to a value within the range of 5 to 20 milliseconds.

Thus, once a time interval corresponding to T_load has elapsed, step 520, and the number of overloaded VCs is not equal to zero, step 522, at step 525, the fair share is updated according to:

$$FS=FS+(Av\_Bw-Ac\_Bw)/\#Ovld\_VC,$$

where FS represents the fair share, Av_Bw represents the available bandwidth for ABR traffic, Ac_Bw represents the arrival rate of ABR traffic at the switch, and #Ovld_VC represents the number of overloaded VCs, that is, the number of active VCs whose most recently examined current communication rate is greater or equal to the fair share.

Preferably, the arrival rate of ABR traffic is measured in cells per second and is obtained by counting the number of ABR cells that arrived at the switch during a predetermined period, such as T_load, and dividing this number by the quantity of the time period, e.g., T_load. It is readily apparent that other techniques can be used to compute the arrival rate of ABR traffic. Similarly, the number of overloaded VCs is preferably computed in accordance with the teachings herein. However, it is readily apparent that other techniques can be used to determine the number of overloaded virtual circuits.

Referring back to FIG. 5 at step 530, if the fair share is less than the reference fair share, then the fair share is updated to equal the reference fair share. The reference fair share is identified as the equal allocation of bandwidth among all active VCs and is used as a minimum value to which the fair share, step 535, can be set during congestion situation. Preferably, the reference fair share is defined as Av_Bw/#Active_VC. If the fair share is greater than the available bandwidth for ABR traffic, then the fair share is updated to a maximum cap of the available bandwidth, steps 540 and 545. At step 550, if the state of the link is congested, then the fair share also is updated to the minimum fair share value which is in this embodiment the reference fair share value.

A variety of methods can be used to identify whether a congestion situation has occurred. In the present embodiment, a congestion flag is set when the queue in the switch holding the ABR traffic exceeds a congested high threshold. The flag is reset when the ABR queue falls below a congested low threshold. Although a single threshold value can be used, the frequency of oscillations and the feedback due to queue length changes around the congestion threshold is minimized by using a high threshold and low threshold. For example, a value of 50 to 100 can be used for the congested high threshold and a value of 5 to 10 can be used for a congested low threshold.

Thus, as described herein, an efficient process for computing the fair share is described. This process lends itself to an efficient hardware implementation, as many of the elements are simple hardware elements, such as registers, counters and the like, controlled by a controller such as finite state machine, microcontroller, microprocessor, or other forms of control logic.

Figure 6:
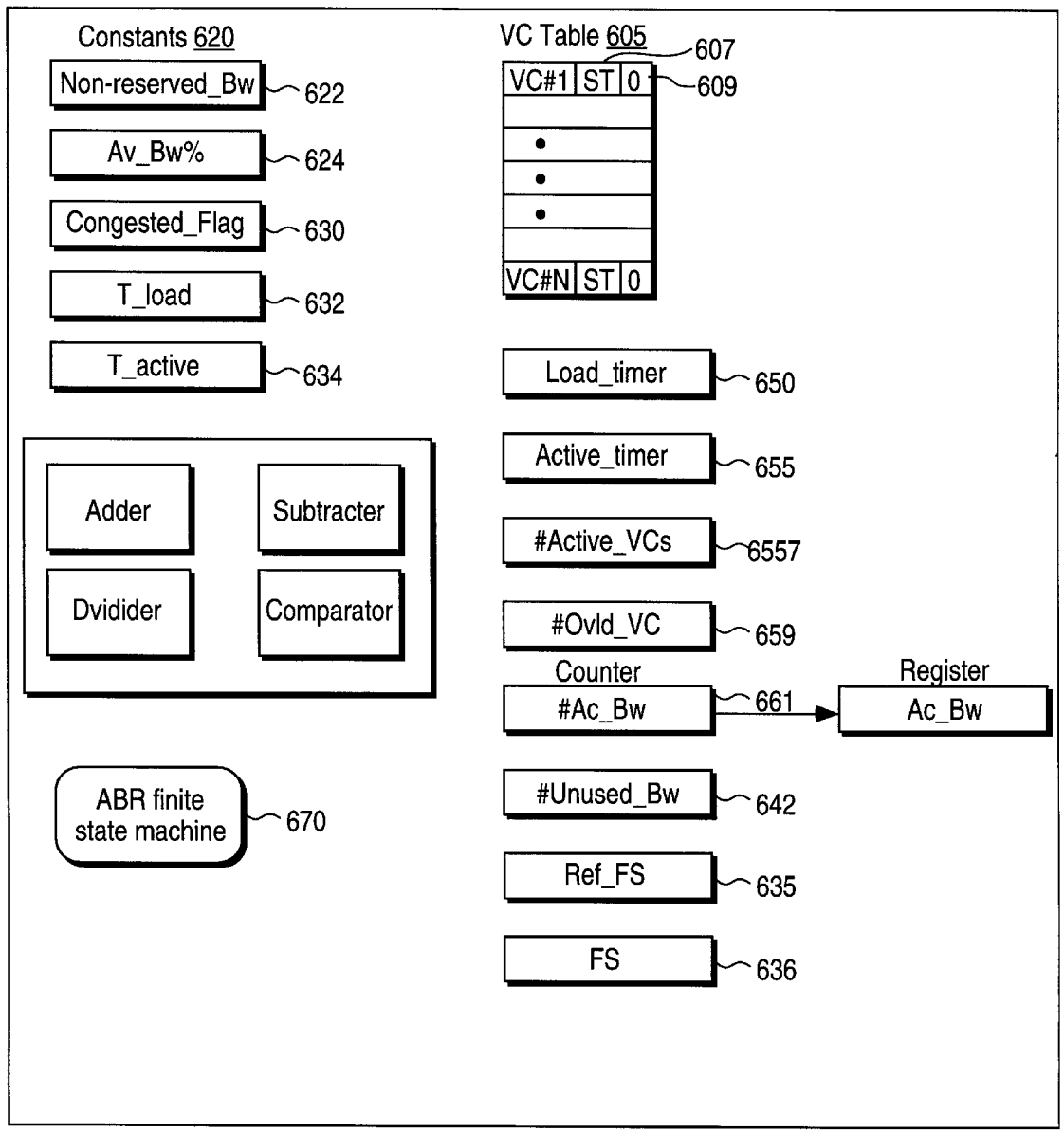
FIG. 6 is a simplified block diagram of one embodiment of elements utilized at the switch for implementing the teachings of the present invention.

FIG. 6 is an illustrative block diagram of one hardware implementation of a portion of a switch that operates in accordance with the teachings of the present invention. The elements shown are utilized to perform the processes described earlier, including determining the number of active VCs, and determining the fair share and the parameters utilized. It is readily apparent that the present invention is not limited to this specific hardware implementation. Furthermore, it is readily apparent that the switch also includes other hardware and software to handle other aspects of switch operation known to those skilled in the art and not described further herein.

Referring to FIG. 6, a VC table 605 maintains a variety of information regarding the VCs routed through the switch. In the embodiment described herein the VC table further includes VC state information. Thus, the VC table 605 includes a plurality of VC entries, each entry including fields identifying parameters with respect to the VC. With regard to the present invention, the VC table further identifies the virtual circuit state 607, and whether the virtual circuit is operating in an overload condition wherein the current communication rate (CCR) is greater than or equal to the fair share computed. Also included are a plurality of constants 620, which are considered parameters utilized in the computation of fair share that generally do not change, or change infrequently under control of a function of the switch that is responsible for changing the values or states during switch operation. These include the amount of non-reserved bandwidth 622, the available bandwidth for ABR traffic 624, the congested high threshold 626, and congested low threshold 628 and the congested flag 630, T_load 632, and T_active 634 (the time period between updates of VC states). Also used are registers or memory locations to store the fair share 636, reference fair share 638, actual bandwidth of ABR traffic 640, and the amount of unused bandwidth available 642. Simple arithmetic and comparator circuitry 680 also is preferably included to compute some of the values described previously.

Counters preferably are included, such as load timer 650 which counts a time period corresponding to T_load, active timer 655 which counts a time period corresponding to T_active, the number of active VC counter which, under control of a finite state machine, 670 increments or decrements the count of the number of active VCs 657 and the number of overloaded VC counter 659 which, under control of the finite state machine 670, maintains a count of the overloaded VCs. In addition, the Ac_Bw counter 661 maintains a count, under control of the finite state machine, of the arrival rate of ABR traffic at the switch. As this value maintains a count of ABR cells that arrive during a period, for example T_load, when the load timer times out, the value currently located in the counter 661 is moved to a register 640, so that the current value can be maintained for calculations and the value in the counter can be reset to count the number of cells during the next time period.

As is readily apparent from the diagrams, the finite state machine in the present embodiment interacts in a manner understood by those skilled in the art, with the constants, the counters and the registers to perform the computations relative to the number of active VCs and the fair share. As is readily apparent, the hardware is straight forward, easy to implement and fast to provide a timely, accurate determination of the fair share, and therefore, an efficient allocation of bandwidth for the different resources.

The invention has been described in conjunction with the preferred embodiment. It is evident that numerous alternatives, modifications, variations and uses will be apparent to those skilled in the art in light of the foregoing description.

What is claimed is:

1. In an asynchronous transfer mode (ATM) network in which available bit rate (ABR) virtual circuits (VCs) are established through at least one link and at least one switch, each virtual connection having a VC state, each VC state starting in an inactive state, a method for computing the number of active virtual connections (#Active_VC) comprising steps of:

when a cell arrives at the switch,
      if the VC state is in the inactive state, setting the VC state to an active state and incrementing #Active_VC by one, and
      if the VC state is in a test state, setting the VC state to active;
   after a first predetermined lapse of time, for each VC state at the switch,
      if the VC state is in the test state, decrementing #Active_VC by one and setting the VC state to inactive, and
      if the VC state is in the active state, setting the VC state to test.

2. The method as set forth in claim 1, further comprising the step of, if after a predetermined lapse of time, a VC state is in the test state, and an overload state for the virtual connection is true, resetting the overload state to false and decrementing by one a count indicative of the number of virtual circuits operating at the switch at a rate greater than a fair share.

3. The method as set forth in claim 1, further comprising the step of computing a fair share of resources according to the following:

$$FS=FS+(Av\_Bw-Ac\_Bw)/(\#Ovld\_VC),$$

where Av_Bw represents the available bandwidth at the switch for available bit rate (ABR) VCs, Ac_Bw represents an arrival rate of ABR cells, and #Ovld_VC represents a number of active VCs whose current communication rate is greater or equal to the fair share.

4. The method as set forth in claim 1, further comprising the steps of:
   when a backward resource management (BRM) cell arrives at the switch, setting an explicit rate (ER) for transmission of cells on the VC to be a function of a fair share of resources and a current communication rate (CCR) of the VC.

5. The method as set forth in claim 1, further comprising the steps of:
   if a forward resource management (FRM) cell arrives at the switch, and if the state of the VC is active or test, determining if an overload state of the VC is true,
      if the overload state of the VC is true and a current communication rate (CCR) is less than a fair share of resources, setting the overload state of the VC to false and decrementing by one a count of a number of VCs in an overload state,
      if the overload state of the VC is false and the CCR is greater than the fair share, setting the overload state to true and incrementing by one the count of the number of VCs in an overload state;
   if a data cell arrives at the switch, and the state of the VC is inactive, setting the overload state to true and incrementing by one the count of the number of VCs in an overload state;
   if an FRM cell arrives at the switch, the state of the VC is inactive, and the CCR is greater than the fair share, setting the overload state to true and incrementing by one the count of the number of VCs in an overload state; and
   if an FRM cell arrives at the switch, the state of the VC is inactive, and the CCR is not greater than the fair share, setting the overload state to false.

6. In an asynchronous transfer mode (ATM) network, in which virtual circuits (VCs) between source and destination devices establish at least one link through at least one switch, a method for computing a fair share bandwidth (FS) for an available bit rate (ABR) VC, said method comprising the step of:
   computing a FS value according to the following equation, $$FS=FS+(Av\_Bw-Ac\_Bw)/(\#Ovld\_Vc),$$

where Av_Bw represents the available bandwidth at the switch for available bit rate (ABR) VCs, Ac_Bw represents an arrival rate of ABR cells, and #Ovld_VC represents a number of active VCs whose current communication rate is greater or equal to the fair share.

7. The method as set forth in claim 6, further comprising the step of selectively adjusting FS as a function of a reference FS, Av_Bw, and congestion.

8. The method as set forth in claim 7, wherein the function comprises the following steps:
   setting the fair share to be equal to the reference FS, if the fair share is less than the reference FS indicative of a minimum value to which the FS can be set during congestion situations;

setting the fair share value to Av_Bw if the FS is greater than Av_Bw; and setting the FS to equal the reference FS if a congestion situation occurs.

9. The method as set forth in claim 6, wherein the Av_Bw is determined as the percent of a total bandwidth at a switch output link that is not reserved.

10. The method as set forth in claim 6, wherein Av_Bw is determined as the percent of total bandwidth the maximum of the non reserved bandwidth at the output link of the switch and the unused bandwidth during a predetermined time interval.

11. The method as set forth in claim 7, wherein the reference FS is determined to be Av_Bw/#Active_VC, where #Active_VC represents a number of active VCs.

12. The method as set forth in claim 7, further comprising the step of updating the reference FS whenever the available bandwidth or number of active VCs changes.

13. The method as set forth in claim 6, wherein Ac_Bw is determined as a number of ABR cells that arrive during a predetermined time period divided by the length of the time period.

14. The method as set forth in claim 7, wherein the congestion situation is indicated when a number of cells in a queue of ABR cells at the switch exceeds a predetermined congestion threshold.

15. In an asynchronous transfer mode (ATM) network, in which virtual circuits (VCs) between source and destination devices establish at least one link through at least one switch, a method for determining a current communication rate (CCR) for an available bit rate (ABR) VC, said method comprising the steps of:

computing a fair share (FS) value according to the following equation, $$FS=FS+(Av\_Bw-Ac\_Bw)/(\#Ovld\_Vc),$$

where Av_Bw represents the available bandwidth at the switch for available bit rate (ABR) VCs, Ac_Bw represents an arrival rate of ABR cells, and #Ovld_VC represents a number of active VCs whose current communication rate is greater or equal to the fair share;

updating an explicit rate (ER) for the VC to a value that is a function of the FS and the CCR; and updating the CCR to a value that is less than or equal to the ER.

16. The method as set forth in claim 15, further comprising the step of selectively adjusting FS as a function of a reference FS, Av_Bw, and congestion.

17. The method as set forth in claim 16, wherein the function comprises the following steps:

setting the fair share to be equal to the reference FS, if the fair share is less than the reference FS indicative of a minimum value to which the FS can be set during congestion situations;

setting the fair share value to Av_Bw if the FS is greater than Av_Bw; and setting the FS to equal the reference FS if a congestion situation occurs.

18. In an asynchronous transfer mode (ATM) network, in which available bit rate (ABR) virtual circuits (VCs) between source and destination devices establish at least one link through at least one switch, at least one switch comprising:

a VC table comprising a VC state indicative of cell transmission activity through a VC for each ABR VC routed through the switch;

a control device coupled to the VC table for determining a fair share bandwidth (FS) for the ABR VC, said device maintaining a count of active VCs (#Active_VC) through the switch, said fair share determined according to the following; $FS=FS+(Av\_Bw-Ac\_Bw)/(\#Ovld\_Vc)$, where Av_Bw represents an available bandwidth at the switch for available bit rate (ABR) VCs, Ac_Bw represents an arrival rate of ABR cells, and #Ovld_VC represents a number of active VCs routed through the switch whose current communication rate (CCR) is greater or equal to the FS;

said FS determined used by a source device to update the CCR of the VC.

19. The switch as set forth in claim 18, wherein the control device further selectively adjusts the FS as a function of a reference FS, Av_Bw, and whether a congestion situation occurs.

20. The switch as set forth in claim 19, wherein the function comprises:

setting the fair share to be equal to the reference FS, if the fair share is less than the reference FS indicative of a minimum value to which the FS can be set during congestion situations;

setting the fair share value to Av_Bw if the FS is greater than Av_Bw; and setting the FS to equal the reference FS if a congestion situation occurs.

21. The switch as set forth in claim 18, wherein each VC state starts in an inactive state, said control device maintaining a count of #Active_VC by performing the following steps:

when a cell arrives at the switch,
if the VC state is in the inactive state, setting the VC state to an active state and incrementing #Active_VC by one, and
if the VC state is in a test state, setting the VC state to active;

after a first predetermined lapse of time, for each VC state at the switch,
if the VC state is in the test state, decrementing #Active_VC by one and setting the VC state to inactive, and
if the VC state is in the active state, setting the VC state to test.

22. In an asynchronous transfer mode (ATM) network, in which available bit rate (ABR) virtual circuits (VCs) between source and destination devices establish at least one link through at least one switch, the at least one switch comprising:

a VC table comprising a VC state indicative of cell transmission activity through a VC for each ABR VC routed through the switch;

a control device coupled to the VC table for determining a fair share bandwidth (FS) for the ABR VC, the device maintaining a count of active VCs (#Active VC) through the switch and using #Active VC to determine FS;

the FS determined used by a source device to update a current communication rate (CCR) of the VC, wherein, said FS is determined according to the following;

$FS=FS+(Av\_Bw-Ac\_Bw)/(\#Ovld\_Vc)$, where Av_Bw represents the available bandwidth at the switch for ABR VCs, Ac_Bw represents an arrival rate of ABR cells, and #Ovld_VC represents a number of active VCs routed through the switch whose current communication rate (CCR) is greater or equal to the FS.

23. An asynchronous transfer mode (ATM) network comprising:
- a plurality of links which physically connect a source device and destination device;
- at least one switch coupled between links, wherein available bit rate (ABR) virtual circuits (VCs) are established between source and destination devices using the at least one switch and the links, the at least one switch comprising:
  - a VC table comprising a VC state indicative of cell transmission activity through a VC for each ABR VC routed through the switch;
  - a control device coupled to the VC table for determining a fair share bandwidth (FS) for the ABR VC, the device maintaining a count of active VCs (#Active VC) through the switch and using #Active VC to determine FS;
  - the FS determined used by a source device to update a current communication rate (CCR) of the VC, wherein, said FS is determined according to the following;

FS=FS+(Av_Bw−Ac_Bw)/(#Ovld_Vc), where Av_Bw represents the available bandwidth at the switch for ABR VCs, Ac_Bw represents an arrival rate of ABR cells, and #Ovld_VC represents a number of active VCs routed through the switch whose current communication rate (CCR) is greater or equal to the FS.

24. An asynchronous transfer mode (ATM) network comprising:
- a plurality of links which physically connect a source device and destination device; and
- at least one switch coupled between links, wherein available bit rate (ABR) virtual circuits (VCs) are established between source and destination devices using at least one switch and links, each virtual connection having a VC state, each VC state starting in an inactive state, at least one switch comprising;
  - logic for computing the number of active virtual connections (#Active_VC), said logic, if the VC state is inactive and a cell arrives at the switch, setting the VC state to an active state and incrementing #Active_VC by one, and if the VC state is in a test state and a cell arrives at the switch, setting the VC state to active; and
  - said logic, after a first predetermined lapse of time, examining each VC state at the switch, and if the VC state is in the test state, decrementing #Active_VC by one and setting the VC state to inactive, and if the VC state is in the active state, setting the VC state to test.

25. In an asynchronous transfer mode (ATM) network in which available bit rate (ABR) virtual circuits (VCs) are established through at least one link and at least one switch, each virtual connection having a VC state, each VC state starting in an inactive state, an apparatus for computing the number of active virtual connections (#Active VC) comprising:
- means for setting the VC state to an active state and incrementing #Active_VC by one when a cell arrives at the switch and the VC state is in the inactive state;,
- means for setting the VC state to active if the VC state is in a test state; means for periodically adjusting VC states for each VC state at the switch after a first predetermined lapse of time, said means for periodically adjusting decrementing #Active_VC by one and setting the VC state to inactive if the VC state is in the test state, and setting the VC state to test if the VC state is in the active state.

* * * * *